(12) United States Patent (10) Patent No.: US 12,618,202 B2

Wesenberg et al. (45) Date of Patent: May 5, 2026

(54) METHOD FOR RENOVATING A ROADWAY AND MACHINE FOR SIMULTANEOUS SPREADING OF FIBRES AND BITUMEN EMULSION

(71) Applicant: COLAS, Paris (FR)

(72) Inventors: Nelson K. Wesenberg, Ann Arbor, MI (US); Jean-Paul Fort, Cincinnati, OH (US)

(73) Assignee: COLAS, Paris (FR)

( * ) Notice: Subject to any disclaimer, the term of this patent is extended or adjusted under 35 U.S.C. 154(b) by 733 days.

(21) Appl. No.: 17/923,399

(22) PCT Filed: May 4, 2021

(86) PCT No.: PCT/EP2021/061759

§ 371 (c)(1),
(2) Date: Nov. 4, 2022

(87) PCT Pub. No.: WO2021/224282

PCT Pub. Date: Nov. 11, 2021

(65) Prior Publication Data

US 2023/0193569 A1 Jun. 22, 2023

(30) Foreign Application Priority Data

May 5, 2020 (FR) ...................................... 2004460

(51) Int. Cl.
E01C 19/21 (2006.01)
C04B 14/42 (2006.01)
(Continued)

(52) U.S. Cl.
CPC .............. E01C 19/21 (2013.01); C04B 14/42 (2013.01); C04B 26/26 (2013.01); E01C 7/187 (2013.01); C04B 2111/0075 (2013.01)

(58) Field of Classification Search
CPC . E01C 7/35; E01C 7/187; E01C 19/21; E01C 11/005; C04B 14/42; C04B 26/26; C04B 2111/0075
See application file for complete search history.

(56) References Cited

U.S. PATENT DOCUMENTS 9,534,146 B2 * 1/2017 Smith ........................ E01C 7/00
2003/0016999 A1 * 1/2003 Jones, IV .............. E01C 11/165
404/111
(Continued)

FOREIGN PATENT DOCUMENTS

EP 0 456 502 11/1991
EP 1 624 110 2/2006
(Continued)

OTHER PUBLICATIONS

International Search Report for PCT/EP2021/061759 dated Jul. 14, 2021, 6 pages.
(Continued)

*Primary Examiner* — William V Gilbert
(74) *Attorney, Agent, or Firm* — NIXON & VANDERHYE

(57) ABSTRACT

In a method for renovating a roadway, a first tack coat including a bitumen emulsion, a second coat of fibres and then a third surface coat that is a "clean" bitumen emulsion or includes an anhydrous asphalt binder, is spread by a spreading machine from bottom to top and overlaid on the milled or planed roadway. The fibres are sprayed onto the tack coat and the sprayed fibres having a maximum length of 12 cm, an asphalt mix being subsequently spread over the surface coat, the residual binder of the "clean" bitumen emulsion having a penetrability of less than 40 dmm and a ball-ring temperature greater than 50° C., the 'clean' bitumen emulsion including between 30% and 70% bitumen, between 30% and 70% water, and between 0.1% and 10%

(Continued)

surfactants, stabilisers and/or additives, the percentages being by weight. The application also relates to a spreading machine.

20 Claims, 4 Drawing Sheets

(51) Int. Cl.
| | | |
|---|---|---|
| *C04B 26/26* | (2006.01) | |
| *E01C 7/18* | (2006.01) | |
| *C04B 111/00* | (2006.01) | |

(56)     References Cited

U.S. PATENT DOCUMENTS

| | | | | |
|---|---|---|---|---|
| 2004/0253384 | A1* | 12/2004 | Simmons | ............... E01C 7/358 |
| | | | | 427/402 |

| | | | | |
|---|---|---|---|---|
| 2014/0127399 | A1* | 5/2014 | Smith | ..................... C08L 95/00 |
| | | | | 106/506 |
| 2018/0079976 | A1* | 3/2018 | Tort | ........................ C08L 61/34 |
| 2018/0155880 | A1* | 6/2018 | Cawthern | ............. E01C 19/176 |
| 2019/0271121 | A1* | 9/2019 | Gorman | ................ E01C 11/165 |
| 2020/0340190 | A1* | 10/2020 | Corcoran | .................. E01C 7/22 |

FOREIGN PATENT DOCUMENTS

| | | |
|---|---|---|
| FR | 2 661 929 | 11/1991 |
| FR | 2 731 709 | 9/1996 |

OTHER PUBLICATIONS

Written Opinion of the ISA for PCT/EP2021/061759 dated Jul. 14, 2021, 7 pages.

* cited by examiner

METHOD FOR RENOVATING A ROADWAY AND MACHINE FOR SIMULTANEOUS SPREADING OF FIBRES AND BITUMEN EMULSION

CROSS-REFERENCE TO RELATED APPLICATIONS

This application is the U.S. national phase of International Application No. PCT/EP2021/061759 filed May 4, 2021 which designated the U.S. and claims priority to FR Patent Application No. 2004460 filed May 5, 2020, the entire contents of each of which are hereby incorporated by reference.

TECHNICAL FIELD

The present invention generally relates to the field of construction and maintenance of traffic pavements and more particularly relates to a method for renovating a traffic pavement as well as a spreading machine configured to implement the method. The concerned traffic pavements are essentially road traffic pavements but the invention can find applications for any type of flooring such as, for example, runways, harbour quays, sport surfaces, car parks, cycle paths.

TECHNOLOGICAL BACKGROUND

Certain traffic pavements may be degraded and generate more or less extended cracks at their surface. The causes of these cracks may be multiple, in particular road traffic extent and/or the structure, including the pavement base. These cracks may be directed perpendicular to the pavement length, which may for example be due to the fact that the pavement includes a coat of bituminous asphalt that has been spread over a structure consisted of concrete slabs separated by joints, the cracks occurring in alignment with the joints. The cracks may be directed along the pavement length, which may for example be due to the fact that the pavement verges are not stabilized. The cracks may also be a result of a poor adhesion between the layers constituting the pavement. Finally, the cracks may be generated by the thermal contraction of the pavement materials.

Anyway, these cracks are a cause of increased speed of pavement deterioration and it is thus important to seal them and, above all, to prevent them from reappearing on the surface.

It is also desirable that the methods implemented for that purpose are simple, fast and inexpensive.

Conventionally, to repair the degraded pavements, the pavement surface is milled to eliminate a determined surface thickness of the degraded pavement, the materials issuing from this milling are eliminated, then one or several new coats of materials are applied. This rehabilitation method being expansive, it may be chosen to apply directly the new pavement layer(s) on a geotextile membrane placed on the existing pavement and preventing/slowing down the rise of cracks.

Documents EP 0 456 502 A2, FR 2 661 929 A1 and EP 1 624 110 A2 are known in the field of the invention.

In this latter document EP 1 624 110, it has been proposed to apply on the existing cracked pavement a membrane made in-situ and consisted of a coat of a bituminous binder, then a coat of glass fibres chopped and sprayed in-situ, then a coat of a bituminous binder, then a gravel spread, intended to protect the membrane from the traffic of the construction machines applying the surface asphalt coat that is subsequently implemented on this membrane. This gravel spread may however affect the quality of bonding of the asphalt coat to the membrane.

Moreover, tack coats consisted of bitumen emulsions are used to ensure bonding between the layers of a pavement structure in order to ensure the structural integrity and thus sustainability thereof. Indeed, the quality of this bonding is essential to pavement survival, because the latter has been dimensioned for the traffic it is intended to receive, as a structure of layers attached to each other. If layers slide between each other, each of them will be subjected individually to higher deformations and stresses than anticipated and will be rapidly degraded by fatigue, affecting the life duration of the whole pavement. Therefore, the life duration of a pavement dimensioned for 20 years might be reduced to 7 or 8 years if the layers thereof become unstuck from each other.

Emulsions for tack coats are traditionally based on "semi-hard" to "soft" bitumen emulsions; but these latter have for drawback, once broken, that their residual binder sticks to the construction machine tyres, affecting the whole binder film and hence the bonding quality, but also causing soiling around the roadwork.

Indeed, once the emulsion broken, the 0.3 to 0.6 kg/m² (0.07 Gal./SY to 0.14 Gal./SY) of residual bitumen adhere to the construction machine tyres, with two negative consequences: firstly, the deterioration of the bitumen film applied over the pavement surface, thus reducing the bonding efficiency and, secondly, the soiling of the adjacent lanes taken by the roadwork traffic.

By "half-hard to soft bitumen", it is meant here a bitumen having a penetrability grade at 25° C., according to the European standard EN-1426 (January 2018) or the American standard ASTM D5 "Penetration of Bituminous Materials" (December 2019), higher than or equal 50 tenths of a mm (dmm), and may correspond, for example, to one or several bitumen materials having the following classes: 50/70, 70/100, 100/150, 160/200, etc.

Moreover, so-called "clean"/"trackless" tack bitumen emulsions that, once spread, may be rapidly "driven on" by vehicles without the vehicle wheels leave tracks or take away the residual binder, have been developed. This type of "clean" emulsion has clearly different properties than the traditional tack emulsions based on "half-hard to soft" bitumen, because these "clean" emulsions are based on so-called "hard" bitumen, characterized by a low penetrability, for example having a penetrability grade at 25° C. lower than or equal to 50 tenths of a mm (dmm), and may correspond for example to one or several bitumen materials having the following classes: 35/50, 20/30, 10/20, 5/15, etc., and a high "ball-ring" temperature according to the European standard EN-1427 (January 2018) or the American standard ASTM D36 (June 2014) "Softening Point of Bitumen (Ring-and-Ball Apparatus)". This "hardness" may however affect the quality of bonding of the residual binder film, especially by cold weather.

The applicant proposes, with the present invention, to eliminate the protective gravel coat conventionally used for making the membrane in-situ, thanks to the use of a "clean" tack coat, the residual bitumen, after breaking of the emulsion and that constitute the tack coat, being "trackless" or "clean".

Solution allowing improvement of:
1. The bonding obtained by making the membrane in-situ, while keeping the ability thereof to reduce and even stop the reappearance or appearance of surface cracks, 2. The bonding with respect to that obtained by the use of so-called "clean" tack coats,
3. The method efficiency by reducing the materials to be used and by simplifying the implementation thereof.

DISCLOSURE OF THE INVENTION

It is firstly proposed according to the invention a method for renovating a vehicle traffic pavement, in which, in a first step, a first bituminous coat, called the tack coat, then a second coat of fibres, then a third bituminous coat, called the surface coat, are spread in a single passage of a spreading machine, from bottom to top and superimposed to each other on the pavement, fibres being sprayed on the tack coat and the sprayed fibres having a maximum length of 12 cm.

According to the invention, the surface layer is a coat of "clean" ("trackless") bitumen emulsion or including an anhydrous bituminous binder, the "clean" ("trackless") bitumen emulsion including so-called "hard" bitumen, the "clean" ("trackless") bitumen emulsion providing a residual binder once the emulsion breaking obtained, the residual binder of the "clean" ("trackless") bitumen emulsion having the following properties: penetrability lower than 40 dmm and Ball-Ring temperature higher than 50° C., and, in a subsequent step, the surface coat (30) is covered with a bituminous asphalt, and the "clean" ("trackless") bitumen emulsion includes from 30% to 70% of bitumen, from 30% to 70% of water, from 0.1% to 10% of surfactant agent(s), stabilizer(s) and/or additive(s), the percentage being in weight, the anhydrous binder having the following properties after evaporation of the light oils: penetrability lower than 40 dmm and Ball-Ring temperature higher than 50° C.

Other non-limiting and advantageous features of the method according to the invention, taken individually or according to any technically possible combination, are the following:

the residual binder of the "clean" ("trackless") bitumen emulsion has preferably the following properties: penetrability lower than 20 dmm and Ball-Ring temperature higher than 60° C., advantageously, the residual binder of the "clean" ("trackless") bitumen emulsion has the following properties: penetrability of about 20 dmm and Ball-Ring temperature of about than 60° C., the anhydrous binder has preferably the following properties after evaporation of the light oils: penetrability lower than 20 dmm and Ball-Ring temperature higher than 60° C., advantageously, the anhydrous binder has preferably the following properties after evaporation of the light oils: penetrability of about 20 dmm and Ball-Ring temperature of about 60° C., the penetrability is evaluated according to standard NF EN 1426-ASTM D5, the Ball-Ring temperature or softening point is evaluated according to standard NF EN 1427-ASTM D36, the subsequent step is carried out with equipment separate from the spraying machine, before the first step, the pavement surface is milled or planed in order to detach surface materials from the pavement and the detached materials are eliminated from the pavement, the vehicles are in particular cars, trucks, construction machines such as pavers, the fibres have a minimum length between 0.5 cm and 2 cm, the fibres have a length of 3 cm, preferably, the fibres have a length of 6 cm, the fibres have a length of 12 cm, the fibres have a maximum length between 3 cm and 12 cm, the fibres are sprayed on the tack coat by a flow of air, the traffic pavement to be renovated contains cracks, the traffic pavement has concrete slabs in its structure, the tack coat includes: either a "clean" ("trackless") bitumen emulsion or an anhydrous bituminous binder, or a bitumen emulsion other than a "clean" ("trackless") bitumen emulsion or a bituminous binder other than an anhydrous bituminous binder, the tack coat comprises or is consisted of a "clean" ("trackless") bitumen emulsion, the tack coat and the surface coat both comprising or being consisted of a "clean" ("trackless") bitumen emulsion, the fibres before their use are stored as coils, the fibres being continuous and wound on the coils, the fibres are chosen among glass fibres and synthetic fibres and organic fibres, synthetic fibres are polyethylene, polypropylene, polyester fibres, or one of their combinations, organic fibres are cellulose fibres, glass or synthetic fibres are obtained by chopping continuous fibres during the passage of the spreading machine, the continuous fibres chopping is made in a fibre spraying device of a bitumen emulsion and fibre spreading system, the device being installed in the spreading machine, equivalently, the "clean" bitumen emulsion of the first coat called the tack coat and/or the third coat called the surface coat is (are) replaced by a hot-spread anhydrous bituminous binder, typically between 150 and 160° C., the anhydrous bituminous binders being intrinsically "trackless", the hot-spread anhydrous bituminous binder is in particular a bitumen having the following performance grades "PG H-L": PG 58-22; PG 64-22 or PG 67-22 (measured according to the AASHTO M320 standard), or these anhydrous binders are fluidized bitumen materials, i.e. bitumen cuts from petroleum or vegetable oils, to lower the viscosity thereof and facilitate the spreading thereof. They are generally applied at temperatures varying from 110 to 160° C. Their viscosity measured by the test STV 40° C. NF T 65-002 is generally between 80 and 300 s.

the hot-spread anhydrous bituminous binder respects the regional climate criteria of the "SuperPave" system (PG), the "clean" bitumen emulsion of one at least of the tack coat and the surface coat is/are replaced by an anhydrous bituminous binder, the "clean" ("trackless") bitumen emulsion includes "hard" bitumen;

according to the invention, "hard bitumen" means a bitumen having a penetrability grade at 25° C. according to the European standard EN-1426 (2018) from 5 to 40 tenths of a mm (dmm), the hard bitumen may correspond for example to one or several bitumen materials having the following classes:

35/50, 20/30, 15/25, 10/20, 5/15 according to the European standards EN-13924-1/2 the additive(s) are one or several polymer(s), the "clean" ("trackless") bitumen emulsion includes from 30% to 70% of bitumen, from 30% to 70% of water, from 0.1% to 10% of surfactant agent(s), stabilizer(s) and/or polymer additive(s) or others, the percentage being in weight, the "clean" ("trackless") bitumen emulsion includes from 30% to 70% of bitumen, from 30% to 70% of water, from 0.1% to 10% of surfactant agent(s), stabilizer(s) and/or polymer additive(s), the percentage being in weight, the "clean" ("trackless") bitumen emulsion includes from 30% to 70% of bitumen, from 30% to 70% of water, from 0.1% to 3% of surfactant agent(s), stabilizer(s) and/or polymer additive(s), the percentage being in weight, the "clean" ("trackless") bitumen emulsion includes from 30% to 70% of bitumen, from 30% to 70% of water, from 0.1% to 3.0% of surfactant agent(s), stabilizer(s) and/or polymer additive(s), the percentage being in weight, the bitumen emulsion, whether it is "clean" or not, has the following properties:

| | |
|---|---|
| Saybolt-Furol Viscosity @ 25 C., secs | 20-150 |
| Sieve non-passing fraction, % Max. | 0.3 |
| Demulsibility, % Min. | 40 |
| Storage stability, % Max, | 1 | according to the invention, "emulsion" means "a heterogeneous system with two or more liquid phases, consisted by a continuous liquid phase and at least one second liquid phase, dispersed in the first one as thin droplets" (standard NF EN ISO 862 (NF T73-000) of October 1995);

in the case of bitumen emulsions, the dispersed liquid phase is pure or modified bitumen, possibly fluidized or fluxed; the continuous liquid phase is an aqueous phase generally based on surface-active agents, such as at least one anionic surfactant, one cationic surfactant and/or one non-ionic surfactant;

by "surfactant", it is meant "a chemical compound having a surface activity that, dissolved in a liquid, in particular water, lowers the surface or interfacial tension thereof by preferential adsorption to the liquid/vapour surface or other interfaces" (Standard NF EN ISO 862);

these surfactants are amphiphilic surface-active agents with lipophilic hydrocarbon chains and hydrophilic polar heads; that way, they catch the bitumen balls in such a way that the two phases remain miscible;

by way of example, the cationic surfactants are obtained, for example, from the reaction of a polyamine with fat acids of animal or vegetal origin, these so-obtained surfactants being of the amidoamine, imidazoline or polyamine type; generally, the polyamines such as diethylene triamine and triethylene tetramine, are from the oil industry;

by way of example, the non-ionic surfactants may be of a saccharide nature called alkyl glycoside, such as the APG (Alkylpolyglucosides) or APP (Alkylpolypentosides) coming respectively from the glucose/fatty alcohol and pentose/alcohol reaction; the patent FR 2 731 709 describes for example the use of these APG as co-surfactants for anionic formulations of bitumen;

generally, in the aqueous phase, we find acids that help solubilising said surfactants and potential additives;

the additives are preferably chosen among the modification agents such as the polymers, the pH-modifying agents, the adhesivity dopes;

the polymers may be chosen among the styrene-butadiene-styrene SBS, styrene-butadiene-rubber SBR, natural latex, ethylene-vinyl acetate EVA, etc.

the adhesivity dopes may be chosen among the alkylpolyamines such as the alkyl amido-polyamines or the alkyl imidazo-polyamines;

as a pH-modifying agent, it is possible to use hydrochloric acid;

the residual binder of the "clean" ("trackless") bitumen emulsion has the following properties:

| | |
|---|---|
| Residue by distillation at 177 C. [oil distillate, % max] | 3 |
| Penetrability dmm, lower than | 40 |
| Ball-Ring temperature, ° C., higher than | 50 |
| Solubility %, Min. | 97 | in the case where the first coat forming the tack coat is consisted of a bitumen emulsion that is not of the "clean" type (i.e. it is not "trackless"), then the residual binder of said bitumen emulsion has the following properties:

| | |
|---|---|
| Elastic recovery, % 10 C., 210 cm elongation: | 55-75 |
| Ductility, cm, Min. | 40 | the tack coat is applied at a dosage of between 0.45 kg/m² (0.1 Gal./SY) and 1.8 kg/m² (0.4 Gal./SY), the fibres are glass fibres and the glass fibre coat is applied at a dosage of between 30 gr/m² (0.9 oz./SY) and 120 gr/m2 (3.5 oz./SY), typically 60 gr/m2 (1.8 oz./SY), the surface coat is applied at a dosage of between 0.45 kg/m² (0.1 Gal./SY) and 1.8 kg/m² (0.4 Gal./SY), the tack coat is applied at a dosage of 1.125 kg/m²+/−0.675 kg/m² (0.25 Gal./SY+/−0.15 Gal./SY) and the surface coat at a dosage of 1.125 kg/m²+/−0.675 kg/m² (0.25 Gal./SY+/−0.15 Gal./SY) and in which the fibres are glass fibres and the glass fibre coat is applied at a dosage of 75 gr/m²+/−45 gr/m² (2.2 oz./SY+/−1.3 oz./SY), in the case of a milled or planed pavement and including parallel grooves, elongated in the pavement length direction, the bitumen emulsion and the fibres are spread in a sufficient quantity to obtain a substantially uniform surface, after the passage of the spreading machine and before the subsequent step in which the surface coat is covered with a bituminous asphalt, no protective gravel coat is spread over the surface coat, after the surface coat has been covered with a bituminous asphalt, a compaction machine is driven over the bituminous asphalt.

In an alternative embodiment of the method of the invention, the pavement surface milling or planning step is omitted, either the three coats are directly spread over the pavement surface during a renovation, or a pavement construction or reconstruction is made and the three coats are spread over a sub-floor of the pavement under construction or reconstruction.

The three coats can hence be spread over an existing pavement in case of a renovation or over a sub-floor of a pavement under construction and, in any case, the surface coat will be the upper coat of the three spread coats, that it to say from bottom to top and superimposed to each other, a first coat called the tack coat consisted of a preferably "clean" bitumen emulsion, then a second coat of fibres, then a third coat called the surface coat, consisted of a "clean" ("trackless") bitumen emulsion.

Once the three coats spread, a bituminous asphalt is spread over the surface coat in a subsequent step.

The invention also relates to a spreading machine for the simultaneous spreading of fibres and bitumen emulsion for a traffic pavement renovation method, the machine having a reserve of fibres, a bitumen emulsion tank and a bitumen emulsion and fibre spreading system, the bitumen emulsion and fibre spreading system including a first bitumen emulsion spreading boom, a fibre spraying device and a second bitumen emulsion spreading boom, the booms including nozzles, the first boom, the fibre spraying device and the second boom being arranged in such a way as to spread successively and superimposed to each other, during the travel of the machine and a single pass, a first coat called the tack coat, consisted of the bitumen emulsion sprayed by the first boom, then a second coat of fibres, sprayed by the fibre spraying device, said sprayed fibres having a maximum length of 12 cm, then a third coat called the surface coat consisted of the bitumen emulsion sprayed by the second boom, the bitumen emulsion tank containing a "clean" ("trackless") bitumen emulsion in such a way that the fibres can be taken between two coats of "clean" ("trackless") bitumen emulsion, the "clean" ("trackless") bitumen emulsion containing so-called "hard" bitumen, the "clean" ("trackless") bitumen emulsion providing a residual binder once the emulsion breaking obtained, the residual binder of the "clean" ("trackless") bitumen emulsion having the following properties: penetrability lower than 40 dmm and Ball-Ring temperature higher than 50° C., and the "clean" ("trackless") bitumen emulsion includes from 30% to 70% of bitumen, from 30% to 70% of water, from 0.1% to 10% of surfactant agent(s), stabilizer(s) and/or additive(s), the percentage being in weight.

In advantageous alternative embodiments of the machine, taken individually or according to any technically possible combinations, are the following:

the machine is self-propelled, the machine is towed, the bitumen emulsion and fibre spreading system is on a towed trailer, the first bitumen emulsion spreading boom for the tack coat is an upstream or front boom with respect to the spraying device and considering the direction of travel of the machine, the second bitumen emulsion spreading boom for the surface coat is a downstream or rear boom with respect to the spraying device and considering the direction of travel of the machine, the fibres are glass fibres, the fibres being in the form of continuous fibres in the reserve of fibres, the fibre spraying device includes a set of modules each including two nozzles and a tool for pulling the continuous fibres, chopping the continuous fibres and spraying the chopped fibres towards the pavement, in alternative embodiments, the machine is configured to allow that the first coat called the tack coat and the third coat called the surface coat are made with different bitumen emulsions, the third coat called the surface coat being however made with a "clean" ("trackless") bitumen emulsion, wherein the first coat called the tack layer can therefore be made with a bitumen emulsion that is not "clean" (i.e. it is not "trackless").

The invention finally relates to the pavement obtained by the implementation of the method of the invention, in which the first coat called the tack coat and the third coat called the surface coat are both composed or consisted of a "clean" or ("trackless") bitumen emulsion and that thus includes a sandwich of fibres between two coats of "clean" ("trackless") bitumen emulsion, the surface coat being moreover covered with a bituminous asphalt.

In an alternative embodiment of the pavement, the first coat forming the tack coat comprises at least or is consisted by a bitumen emulsion that is not of the "clean" type (i.e. it is not "trackless").

In another alternative embodiment of the pavement, the first coat forming the tack coat comprises at least or is consisted by an emulsion resulting from the mixture of "soft" and "hard" bitumen materials.

In still another alternative embodiment of the pavement, the first coat forming the tack coat is made by spreading a coat of "soft" bitumen emulsion coat (i.e. non "trackless") followed, above it, with a coat of "hard"/"clean" (i.e. "trackless") bitumen emulsion.

Thanks to the invention, it is not necessary to spread at the surface, over the bitumen emulsion covering the fibres, an additional coat of gravels before spreading a bituminous asphalt. Moreover, after the application of the surface coat 30, a bituminous asphalt is almost immediately and directly applied on the surface coat, and then, compactors may operate. The operations on the pavement are hence reduced and the pavement can be given back to traffic far more rapidly than with the traditional methods.

For the rest of the description, unless otherwise specified, the indication of an interval of values "from X to Y" or "between X and Y" is understood, in the present invention, as including the values X and Y.

DETAILED DESCRIPTION OF AN EMBODIMENT

Figure 1:
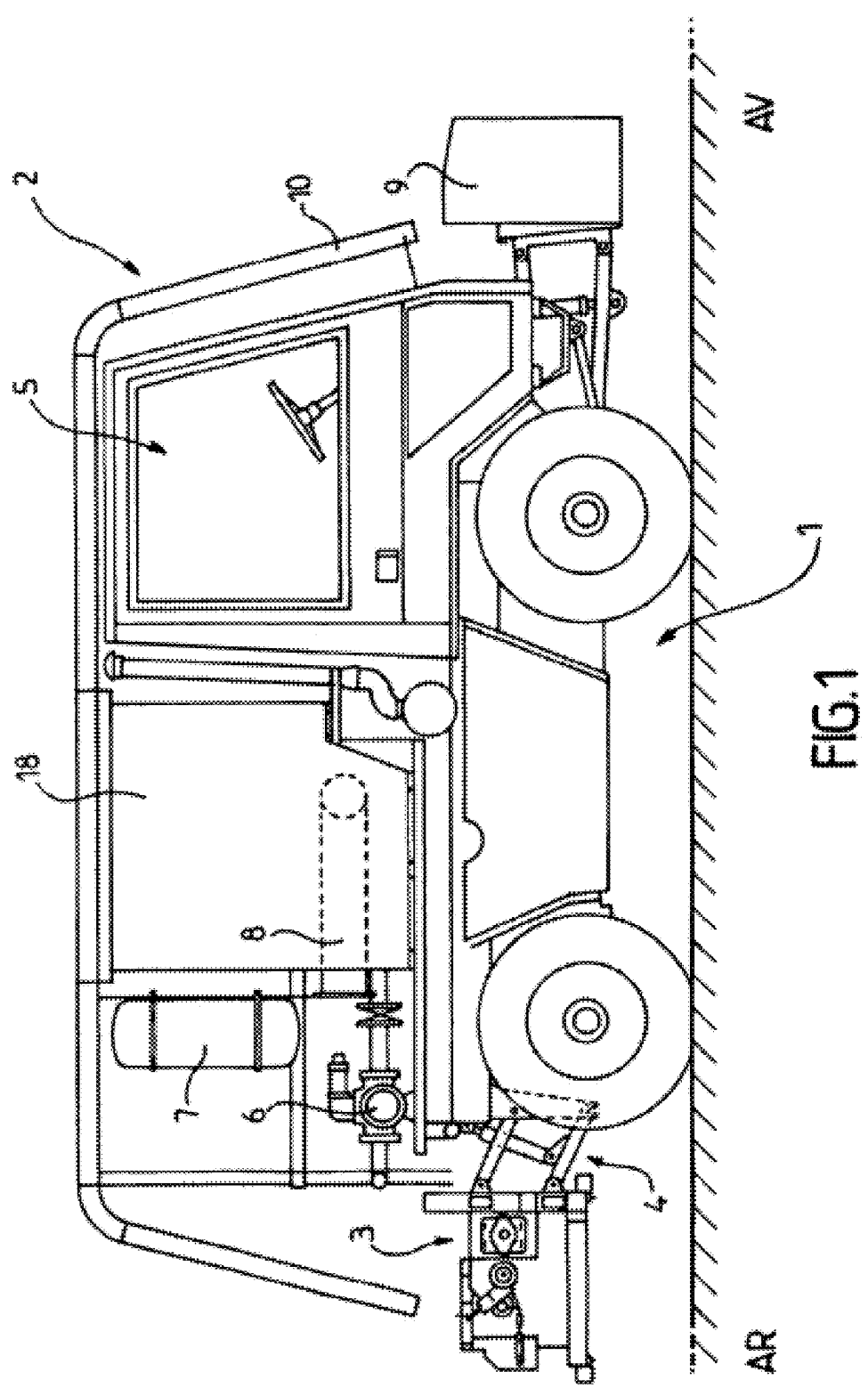
FIG. 1 shows a side view of a machine, with a bitumen emulsion and fibre spreading system lifted for circulation between roadworks.

The following description in relation with the appended drawings, given by way of non-limiting examples, will allow a good understanding of what the invention consists of and of how it can be implemented.

In the principle of a first embodiment in which a "clean" ("trackless") bitumen emulsion is used, a method for renovating a vehicle traffic pavement is implemented, in which, in a first step, a first coat called the tack coat, comprising at least or being consisted of a bitumen emulsion, then a second coat of fibres, then a third coat called the surface coat comprising at least or being consisted of a "clean" ("trackless") bitumen emulsion, are spread in a single passage of a spreading machine, from bottom to top and superimposed to each other on the pavement, fibres being sprayed on the tack coat and the sprayed fibres having a maximum length of 12 cm and, in a subsequent step, the surface coat is covered with a bituminous asphalt.

This "clean" ("trackless") bitumen emulsion is based on bitumen materials, modified or not, whose hardness has been adjusted so that they do not adhere to the truck tyres but can be activated by the temperature of the hot-applied bituminous asphalts and to thus ensure the bonding. To this thermo-adhesive effect (functional definition) is added a rapid breaking of these emulsions, generally within less than 30 minutes, allowing the fast implementation of the asphalts and better roadwork efficiencies.

The residual bitumen materials of these "clean" ("trackless") emulsions are characterized by two tests:

Penetrability (NF EN 1426-ASTM D5) lower than 40 dmm and preferably lower than 20 dmm, or even of 20 dmm;

Ball-Ring softening point (NF EN 1427-ASTM D36) higher than 50° C. and preferably higher than 60° C., or even of about 60° C.

In the principle of a second embodiment in which an anhydrous bitumen binder is used, a method for renovating a vehicle traffic pavement is implemented, in which, in a first step, a first coat called the tack coat, comprising at least or being consisted of a bitumen emulsion, then a second coat of fibres, then a third coat called the surface coat comprising at least or being consisted of an anhydrous bituminous binder, are spread in a single passage of a spreading machine, from bottom to top and superimposed to each other on the pavement, fibres being sprayed on the tack coat and the sprayed fibres having a maximum length of 12 cm and, in a subsequent step, the surface coat is covered with a bituminous asphalt.

The hot-spread anhydrous bituminous binders may be:

In particular a bitumen having the following performance grades "PG H-L": PG 58-22; PG 64-22 or PG 67-22 (measured according to the AASHTO M320 standard). They are generally applied at temperatures varying from 150 to 160° C.

Or these anhydrous binders are fluidized bitumen, i.e. bitumen cuts from petroleum or vegetable oils, to lower the viscosity thereof and facilitate the spreading thereof. They are generally applied at temperatures varying from 110 to 150° C. Their viscosity measured by the test STV 40° C. NF T 65-002 is generally between 80 and 300 s. After evaporation of light oils, the spread binder has characteristics similar to those of the residual binder of the "clean" emulsions, i.e.:

Penetrability (NF EN 1426-ASTM D5) lower than 40 dmm and preferably lower than 20 dmm, or even of about 20 dmm;

Ball-Ring softening point (NF EN 1427-ASTM D36) higher than 50° C. and preferably higher than 60° C., or even of about 60° C.

Figure 4:
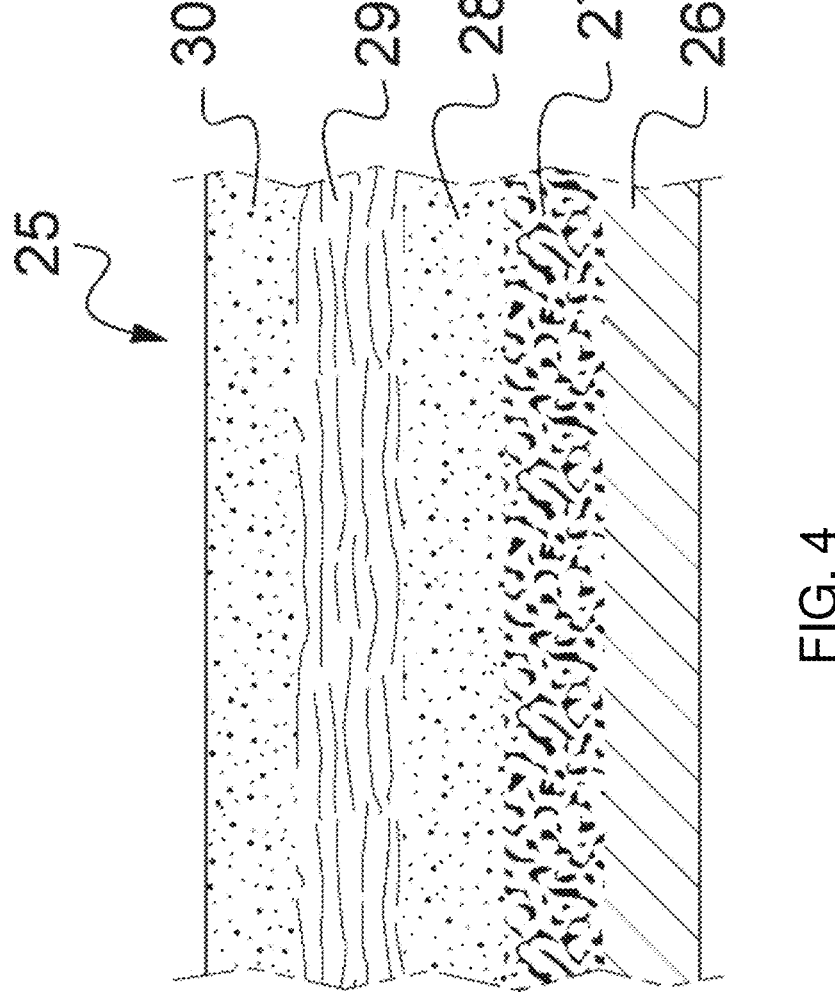
FIG. 4 shows a cross-sectional view of a pavement renovated according to the method of the invention.

We will first present, in relation with FIG. 4, the renovated pavement obtained with the method of the invention and that implementation of the spreading machine of the invention makes possible.

This renovated pavement 25 has been obtained from an initial pavement, the upper surface of which has been milled or planed (these terms being equivalent in the context of the invention) and from which the milling products have been removed. This renovated pavement has been schematized in FIG. 4 by a milled coat 27 of the asphalt type on a sub-floor 26. It is understood that the milled coat 27 may be of any type and depends on the structure of the initial pavement.

This milled layer 27 may for example be a worn-out road with a milled surface. A first coat called the tack coat 28 of "clean" ("trackless") bitumen emulsion has been spread over the milled coat 27, then a second coat of fibres 29, and finally a third coat called surface coat 30 of "clean" bitumen emulsion. This assembly is then covered with a bituminous asphalt (not shown in FIG. 4) and the whole is then compacted. After spreading of the three coats 28, 29, 30 and of the bituminous asphalt, a compactor or equivalent is thus driven over the whole.

A sandwich consisted of fibres between two layers of a same "clean" bitumen emulsion has thus been made.

Equivalently, the tack coat 28 and the surface coat 30 are "clean" ("trackless") but one of them or both are not a bitumen emulsion but a hot-spread anhydrous bituminous binder, typically between 110 and 160° C., the anhydrous bituminous binders being intrinsically "trackless".

In the case where two different emulsions are used, a first one for the tack coat 28 and a second one for the surface coat 30, the first, tack coat may be based on a softer bitumen in order to favour the bonding, whereas the surface coat is of the "clean"/"trackless" type.

Generally, a "clean"/"trackless" tack coat is a coat of bitumen emulsion that, once the emulsion breaking has occurred, can be driven on and on which the tyres or wheels do not leave any tracks and the bitumen does not stick to the tyres or wheels.

This type of "trackless" emulsion sometimes qualified as thermo-adhesive is in particular formulated with hard bituminous binders, modified or not. The residual binder of the "clean" ("trackless") bitumen emulsion, once the emulsion breaking obtained, has generally the following characteristics: penetrability lower than 40 dmm and preferably lower than 20 dmm, or even of 20 dmm, and softening point higher than 50° C., preferably higher than 60° C., or even of about 60° C., according to the standards EN-1426 or ASTM D5 "Penetration of Bituminous Materials" and EN-1427 or ASTM D36 "Softening Point of Bitumen (Ring-and-Ball Apparatus)". According to the invention, by "residual binder", it is meant the residual bitumen obtained once the "clean" ("trackless") bitumen emulsion broken.

The breaking process of an emulsion occurs in several steps: (1) Flocculation: the corpuscles of the bitumen phase dispersed in the aqueous phase move closer to each other, forming a loose network; (2) Coagulation: the bitumen phase and the aqueous phase split apart from each other with the corpuscle agglomeration into a continuous film; (3) Setting: the bitumen film adheres to its support, the rest of water is expelled; (4) Maturing: when the residual binder contains light oils that evaporate.

The bituminous emulsion according to the invention may contain the usual additives used in the technique and in particular stabilizers, anti-freezing agents, thickening agents, natural or synthetic latex (for example, a styrene-butadiene-styrene (SBS) or polychloroprene or styrene-butadiene-rubber (SBR) latex), which are preferably added to the dispersing aqueous phase, It is to be noted that the opening of the renovation area to traffic depends on the emulsion breaking speed. It is therefore advantageous to make fast-breaking emulsions for the "Trackless" tack coats in order to optimize the renovation works. The anhydrous bituminous binder has similar properties and once spread over a pavement, the latter may be driven on and the tyres or wheels do not leave any tracks and the binder does not stick to the tyres or wheels.

The fibres are typically glass fibres resulting from a chopping of continuous glass fibres. In practice, given the quantities of materials (fibres and bitumen emulsion) implemented, the fibres are embedded in the bitumen emulsion and the bitumen emulsions of both coats 28, 30 are then in continuity with each other through the coat of fibres.

In an alternative embodiment, the tack coat 28 is a bitumen emulsion but which is not of the "clean" type (it is not "trackless").

The exemplified spreading machine, which is self-propelled, can store only one type of bitumen emulsion and that is a "clean" ("trackless") bitumen emulsion. The machine includes in practice a single tank of "clean"-type bitumen emulsion. In alternative embodiments, it may be provided to distribute the "clean" bitumen emulsion between several storage means within the machine, in particular to usefully distribute the masses.

Moreover, this machine uses fibres that are glass fibres and these fibres are stored in the machine as continuous glass fibres.

The bitumen emulsion and fibre spreading system of the machine is modular. The modules are arranged transversely, side-by-side, and each allow spreading over a length strip of the pavement, "clean" bitumen emulsion for the tack coat, fibres for the coat of fibres, and the "clean" bitumen emulsion for the surface coat, the coats being superimposed to each other. Each module includes, from front to rear considering the direction of travel of the machine: a first nozzle for spreading the "clean" bitumen emulsion for the tack coat, a tool being provided for pulling continuous fibres, chopping the continuous fibres and spraying the chopped fibres towards the pavement on the tack coat, and a second nozzle for spreading the "clean" bitumen emulsion for the surface coat. The first and second nozzles are connected to a common "clean" bitumen emulsion distributor.

The bitumen emulsion and fibre spreading system thus includes twice as many nozzles as tools for chopping continuous fibres due to the fact that each module comprises two nozzles and one tool. This system allows a homogeneous transverse distribution of fibres whose accuracy is located at any point in a deviation of less than 10%, over the processed pavement width.

The tools are arranged in a fibre spraying device that includes a casing to prevent inappropriate dispersion of chopped fibres. The casing, which is normally closed on its upper and side faces, is open towards the bottom and the pavement.

Due to the transverse arrangement, side-by-side, of the nozzles, for the first nozzles, a first boom is formed for the spreading of "clean" bitumen emulsion for the tack coat, and for the second nozzles, a second boom is formed for the spreading of "clean" bitumen emulsion for the surface coat.

It is to be noted that the term "boom" is used for a set of nozzles but that this term covers both the case in which the nozzles are all fed by a same collector/feeder and are then controlled together as a whole in opening and closing, and the case in which the nozzles are controlled individually or by sub-sets of common sub-collector/feeder.

Each nozzle produces a fan-shaped spray of "clean" bitumen emulsion substantially over a transverse strip of pavement corresponding substantially to the width of the module and in such a way as to form an essentially homogeneous coat of emulsion under the corresponding boom by the sprays of the first or second nozzles, respectively, of the different modules.

Each tool of the fibre spraying device is operated by a common force transmission member that is a rotation driving shaft arranged transversely and passing though said tools. Each tool is mounted removable between a working position in which it is driven by the driving shaft and a disengagement position in which it is accessible to an operator and stopped. The removable mounting of the tool is a pivot mounting, the tool being disengaged from the module by the top. However, preferably, the removable mounting of the tool in its module further allows a rest position in which the tool is not driven by the driving shaft while being in the module in such a way that the carter of the fibre projection device is closed on its upper and lateral faces and allows the machine to work whereas certain tools have been stopped. Shut-off valves can be provided for each nozzle or sub-set of nozzles.

In addition to the easy accessibility of all the mechanical elements due to the modularity implemented, each tool is individually dismountable and accessible in a few seconds for cleaning, adjustment, replacement of cutting blades or replacement by standard exchange. Due to its structure, the risk of accidents during maintenance is reduced because the tools are no longer operational when they are pivoted and accessible.

The tool comprises a first axis able to be rotatably engaged with the driving shaft and carrying a chopping roller, a second axis carrying a pressing roller intended to maintain the continuous fibre in contact with the chopping roller and a third axis carrying a holding roller for holding the continuous fibre on the pressing roller upstream from the chopping roller.

Preferably, the length of the chopped fibres is adjustable. Typically, at least three sizes of chopped fibres may be chosen: 3, 6 or 12 cm. The rotation of the driving shaft is ensured by a hydraulic motor. The flowrate of chopped fibres is adjustable by a control of the speed of rotation of the driving shaft. The quantity of "clean" bitumen emulsion spread over the pavement is adjustable thanks to an adjustable pressurizing means of the "clean" bitumen emulsion sent to the nozzles.

The operation of the hydraulic motor is remotely controlled and the first and second booms have, upstream, on the common distributor side, a remote-controlled valve for cutting or not the spreading of the "clean" bitumen emulsion by the booms, the control of the hydraulic motor and the valve operation being common in order to allow or not the simultaneous spreading of chopped fibres and of the "clean" bitumen emulsion for the whole bitumen emulsion and fibre spreading system of the machine. In a more evolved embodiment, as regards the booms, several valves are provided, each controlling a sub-set of adjacent modules in order to allow or not the spreading for the two nozzles of each module controlled by the valve. Finally, in a far more evolved embodiment, as regards the booms, it is provided one valve per module, in order to allow or not the spreading for the two nozzles of each module individually.

The bitumen emulsion and fibre spreading system is moveable vertically on the rear of the machine and can be lifted or lowered according to the needs. During the spreading, the system is lowered down in order to be close to the pavement.

The bitumen emulsion and fibre spreading system shown in the figures is a fixed unit extending transversely (i.e. along the pavement width), whose maximum pavement width processed (i.e. with all the modules operational) is fixed and determined and corresponds substantially to the machine width.

However, means are provided, which allow a variable maximum pavement width processed exceeding the machine width, for example using several bitumen emulsion and fibre spreading systems, some of which are foldable on the rear of the machine like folding agricultural spray booms that can be folded on the rear of a tractor to be brought back within the width of the tractor. As an alternative, at least two bitumen emulsion and fibre spreading systems are provided, staggered longitudinally or vertically and able to shift horizontally between each other between a position in which the systems are all on the rear of the machine and positions laterally staggered between the systems and the rear of the machine. As another alternative, a telescopic bitumen emulsion and fibre spreading system is provided, the driving shaft being telescopic and the modules being liable to move away from each other, the casing having telescopic parts or flexible parts of the bellow type and the emulsion spreading width being adjusted by the height of the system with respect to the pavement due to the fact that the sprays are fan shaped. Combinations of these different solutions are contemplated to obtain a variable maximum spreading width.

Said machine shown is therefore a self-propelled road vehicle with a control and driver's cab. The vehicle motor operates a hydraulic pump to operate the hydraulic motor of the driving shaft.

The machine shown comprises a bitumen emulsion and fibre spreading system, a "clean" bitumen emulsion tank, a means for fluidizing said "clean" bitumen emulsion, a means for pressurizing said "clean" bitumen emulsion for sending it to the boom nozzles, a reserve of continuous glass fibres, an air compressor and a reserve of compressed air intended at least to the over-pressurizing of the casing and to the spraying of the chopped fibres to the pavement.

The compressed air may further serve to pressurize the "clean" bitumen emulsion and the air pressure adjustment therefore allows adjusting the emulsion spraying flow rate. However, in the case where the emulsion pressurizing means is an emulsion pump, a "clean" bitumen emulsion recirculation circuit may be provided, the part not sent towards the nozzles being sent back to the "clean" bitumen emulsion tank, the flow rate of this sent-back part and/or the emulsion pump flow rate being adjustable in order to adjust the quantity of emulsion spread over the pavement.

The controls and adjustments of the machine operation, in particular of the bitumen emulsion and fibre spreading system and the associated circuits, are made under the supervision of an operator installed in the driver's cab but a remote control and adjustment panel can be provided, outside the driver's cab.

One or several cameras, the display screen(s) of which are in the driver's cab, can film the bitumen emulsion and fibre spreading system and the pavement on the rear of said system for the operator to have visual information about the system and the spreading result.

The bitumen emulsion and fibre spreading system and the machine allow flow rate adjustments over a wide range, both for the chopped fibres and for the emulsion. Preferably, a control system with a micro-processor allows ensuring a spreading that is substantially constant in quantity of "clean" bitumen emulsion and chopped fibres despite the variations in the travel speed and in the number of operational modules and hence the spreading width. The operator can thus program the quantities of "clean" bitumen emulsion and fibres or a particular fibre/emulsion ratio, and the machine will respect the recommendations thereof independently of the speed and/or will signal incompatibilities.

Therefore, the invention makes it possible to reach improved reliability and repeatability, steadiness in terms of compliance with the objectives, with the quantities applied, while offering possibilities of adaptation to significant volume variations. Moreover, the reduced pressure value for binder ejection through the nozzles with respect to the known systems allows a significant reduction in spurious emissions and splashes estimated at up to 50%.

The "clean" bitumen emulsion tank includes a stirring means for homogenizing said "clean" bitumen emulsion.

The means for fluidizing the "clean" bitumen emulsion is a heater with a burner for a fuel selected from oil or gas or other and, preferably, a light fuel oil. The burner is self-igniting and a system for regulating the temperature according to a setpoint is implemented. As an alternative, an electric heater can be used.

The hydraulic pump or the compressed air may further serve to activate actuators and, for example, one or several cylinders for lifting the bitumen emulsion and fibre spreading system.

Provision is made for manual use by an operator, according to the machine, of a gun for application of the "clean" bitumen emulsion in order to correct potential spread irregularities of the surface coat, the gun being connected to a machine by a hose.

For the storage of glass fibres, the machine comprises a reserve of continuous fibres in the form of a set of fibre coils. The reserve of continuous fibres is arranged in front of the machine, at a place of easy access for replacement/recharging of the fibre coils, which also favours a certain distribution of the masses on the machine. The continuous glass fibres go from the reserve to the bitumen emulsion and fibre spreading system through ducts on the top part of the machine.

The bitumen emulsion and fibre spreading system may be attached, in a removable manner or not, to the rear of the machine. It has been seen that the bitumen emulsion and fibre spreading system can be lifted or lowered and, it is potentially provided that it can also be laterally shifted to laterally protrude on either side of the machine.

The vehicle shown is four-wheel drive and allows a spreading speed between about 2 (1.24 miles per hour) and 5 km/h (3.11 miles per hour) for a distribution of chopped fibres of between 0 and about 200 grams/$^2$ (0 and 5.9 oz/SY) of pavement and a "clean" bitumen emulsion flow rate between about 0 and 3.5 litres/m$^2$ (0 and 0.77 Gal./SY). The zero values correspond to a spreading stop, in particular for travels between roadworks.

More precisely, in relation with FIG. 1, the four-wheel drive self-propelled road vehicle 2 constituting the machine 1 comprises, on the front, a control and driver's cab 5 for an operator. On the front of the cab 5 is arranged a reserve of fibres including continuous fibre coils, the reserve of fibres being in the form of a hooded trunk 9 that is at access height for an operator having open the hood to install and replace the coils once the latter empty. In an alternative not shown, the trunk 9 is mounted on the front, with a suspension intended to dampen the effects of pavement irregularities at the trunk 9. A set of ducts 10 allows transporting the continuous fibres to the rear of the vehicle, into the bitumen emulsion and fibre spreading system 3, passing over the top part of said vehicle. In other embodiments, the continuous fibres can be sent towards the rear in a different manner, and for example through lateral, or even lower ducts.

During the replacement of a coil, in order to send from the front and the trunk 9 to the rear and the bitumen emulsion and fibre spreading system 3 a new continuous fibre from a new coil, the operator manually engages the end of the continuous strand of the new coil into the front hole of the duct then, with a compressed air gun, he sends compressed air through this same front hole, which creates a front-rear air flow in the duct that drives the continuous fibre towards the modules. Once the so-driven continuous fibre has exited through the rear hole of the duct, it is caught up by the corresponding tool, the latter being in working position, and the operator can then stop blowing compressed air into the duct. A compressed air gun is thus made available at the front of the vehicle 2.

The vehicle 2 is powered by a liquid fuel engine of the light fuel oil type. A tank 18 of about 1000 litres for the "clean" bitumen emulsion occupies the frame part at the rear of the cab 5. The tank includes at its top part a filling access door. A heating means is used to fluidize the "clean" bitumen emulsion, as a burner 8, preferably automatic, using light fuel oil, which is taken from the vehicle's fuel tank. Let's note that, in alternative embodiments not shown, the heater may use gas, heavy fuel oil or any other combustible substance, or even electricity.

At the rear of the vehicle 2 and on the frame thereof are located a pump 6 for pressurizing the "clean" bitumen emulsion and a tank 7 of about 30 litres for compressed air produced by an air compressor, preferably the vehicle's own air compressor and which is used for braking. A part of the "clean" bitumen emulsion passing through the pump 6 may be sent back into the bitumen emulsion tank 18 for recirculation. In an alternative or combination not shown, the pressurizing of the "clean" bitumen emulsion may be obtained with the compressed air. Advantageously, compressed air may be sent into a part of the "clean" bitumen emulsion circuit for its emptying and cleaning at the end of a roadwork, in particular to prevent the nozzles from becoming blocked.

The bitumen emulsion and fibre spreading system 3 is mounted on the rear of the vehicle 2 frame by means of a controlled mobile coupling 4. The controlled mobile coupling 4 is, in FIG. 1, lifted in transport position, the system 3 being then remote from the pavement. The mobile coupling 4 can also be put in a spreading position, the system 3 being then lowered down and close to the pavement, as will be described latter in relation with FIG. 2. It may be provided that the mobile coupling 4 further allows a lateral movement of the bitumen emulsion and fibre spreading system 3.

Suitable coupling means are implemented between the bitumen emulsion and fibre spreading system 3 and the vehicle 2 in order to allow the passage of the "clean" bitumen emulsion, the compressed air, the continuous fibres, the hydraulic energy/fluid and the control and command circuits. In particular, the bitumen emulsion and fibre spreading system 3 receives the "clean" bitumen emulsion pressurized by the pump 6 by at least one flexible duct non shown here. Likewise, the compressed air of the tank 7 is sent in the bitumen emulsion and fibre spreading system 3 through flexible ducts. Finally, the continuous fibres that exit from the ducts 10 to reach the bitumen emulsion and fibre spreading system 3 are intrinsically flexible and can be pulled to be unwound from the coils.

The bitumen emulsion and fibre spreading system 3 that is seen laterally in FIG. 1 includes a set of modules. This set of modules forms two booms with "clean" bitumen emulsion spreading nozzles 14, 15 and a fibre spraying device arranged between the two booms. The fibre spraying device that is in a casing includes, for each module, a tool for pulling the continuous fibres, chopping them and spreading them over the pavement.

The machine 1, which is consisted of the vehicle 2 and its bitumen emulsion and fibre spreading system 3 on the rear, as well as its reserve of continuous fibres on the front, has the following approximate size: total length 4750 mm (187 inches), total width 1300 mm (51.18 inches) total height 2300 mm (90.55 inches), spreading width 1200 mm (47.24 inches). The machine operational weight is of about 4750 kg (10473 pounds) and it may move between the roadworks at a maximum speed of about 40 km/h (24.85 miles per hour). An automated control system of the micro-computer type with a display screen enables an operator in the vehicle driver's cab to select operating modes (stopping certain modules, respective "clean" bitumen emulsion and/or chopped fibre flow rates, travel speed . . . ), to control and regulate the machine operation (in particular the flow rates as a function of the travel speed, "clean" bitumen emulsion heating regulation . . . ), to signal faults and to provide reports on the operational activity of the machine.

In the example shown, the bitumen emulsion and fibre spreading system 3 includes twelves modules, i.e. twelve tools and twenty-four nozzles 14, 15. Such a machine allows a maximum working width of 1.20 m (47.24 inches), but it also makes it possible to work with smaller widths, by pitches of 100 mm (3.93 inches) (the width of one module), by stopping certain modules (stopping the tool and the two corresponding sprays). It is understood that the bitumen emulsion and fibre spreading system 3, due to its modularity, is easily adaptable to different widths while keeping a similar architecture.

Control valves are implemented in the fluidic circuit for supplying the "clean" bitumen emulsion towards the modules in such a way as to be able to individually cut, on demand, the emulsion supply of each module (two nozzles).

Preferably, overpressure is maintained by compressed air in all the modules, even those which are not operational, to prevent emulsion vapour from rising to the tools. The over-pressurizing of the modules may also have a favourable effect on the downward ejection of the chopped fibres, the modules being open only downward in working position and, preferably, also in rest position thanks to a double articulation of the tools, and the flow of air being able to escape only through the bottom. As an alternative, controlled valves may be provided for the compressed air of each module.

Means for regulating according to a setpoint the pressure of the fluidic "clean" bitumen emulsion circuit acting on the pump 6 and/or on the compressed air in the case where the latter is used for pressurizing the emulsion may be implemented in order to keep substantially constant the pressure in the nozzles 14, 15, the setpoint being able to vary as a function of a schedule and of the operational conditions (travel speed, quantity to be spread . . . ). Means for regulating according to a setpoint the compressed air pressure can also be implemented. In a particular configuration, the actuator for engaging the tool 13 on the driving shaft 12 and the valve for supplying the two nozzles 14, 15 of a given module with the "clean" bitumen emulsion are controlled in parallel in such a way that when the tool 13 of the module is stopped (or in disengagement position), the supply of the nozzles with the "clean" bitumen emulsion is also stopped.

Figure 2:
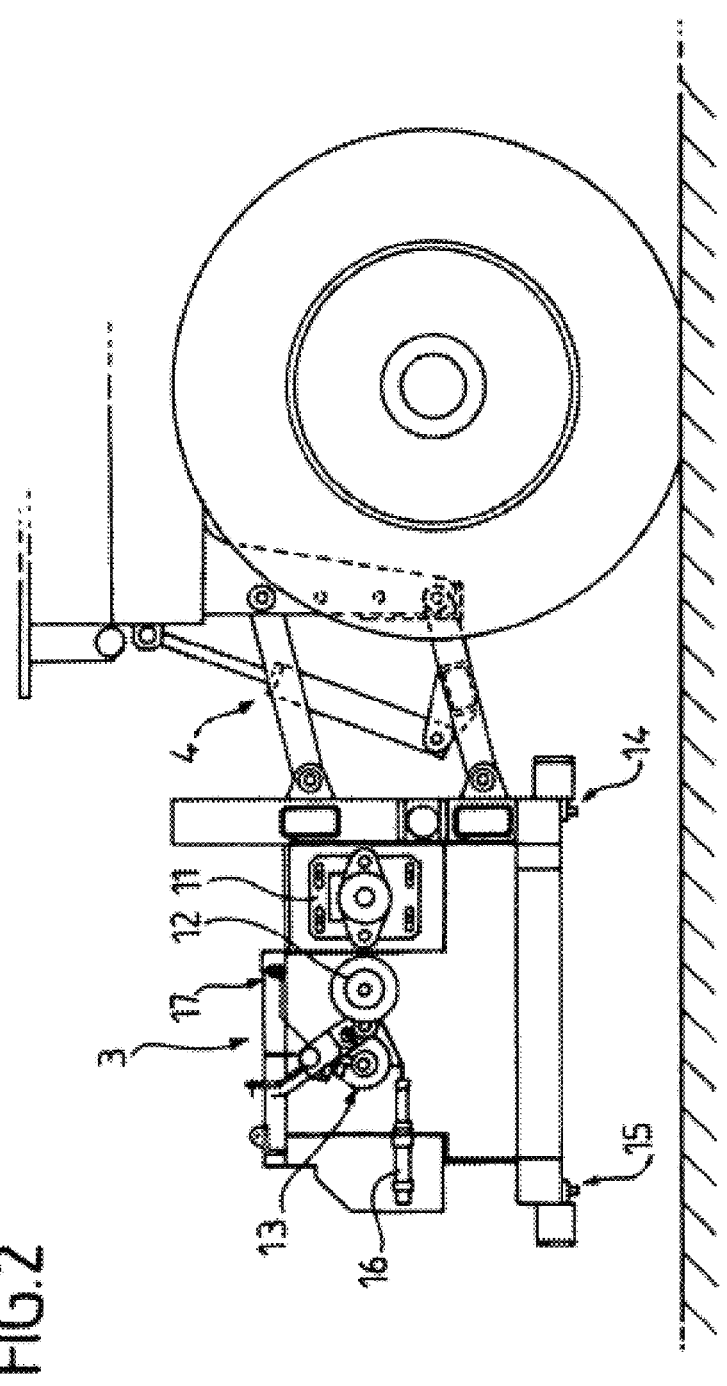
FIG. 2 shows a side view on the rear of a machine, with the bitumen emulsion and fibre spreading system lowered in spreading position.

FIG. 2 makes it possible to see the bitumen emulsion and fibre spreading system 3 in its spreading position, the control of the coupling 4 having lowered it down. In each module, a first nozzle 14 towards the front, and a second nozzle 15 towards the rear, for spraying the "clean" bitumen emulsion over the pavement, surround the fibre spraying device with its modules each comprising a tool 13 for distributing chopped fibres over the pavement. The tools 13 are operated by a functional engagement with the driven shaft 12 common to the different modules and itself operated by a motor 11 arranged in the bitumen emulsion and fibre spreading system 3. The motor 11 is preferably hydraulic but, in some alternatives, it may be mechanical, pneumatic or electric, or other. The transmission between the motor 11 and the driving shaft 12 is preferably made by a belt, although other means can be implemented (chain or gears) or even the drive be direct.

Each of the tools 13 is removably mounted in its module between a disengagement position where it is accessible to an operator outside the module and stopped and two positions inside the module: a working position in which it is engaged with and driven by the driving shaft and a rest position in which it is stopped, the tool been then no longer engaged.

The removable mounting of the tool 13 is pivoted on a hinge 17, the tool being disengaged from the module by the top to leave free access to the operator, towards the rear, to the rollers, chopping means, driving means and others, these latter being on a swivelling tool frame. When the tool is in the module (in working or rest position), the module is closed on all its faces except the lower face, towards the ground. Thanks to a second articulation within the tool, it is possible to have a working position (in functional engagement with the driving shaft) and a rest position (non-engagement) whereas the tool is in the module and the module is closed. The shifting from the working position to the rest one, and conversely, is obtained by implementation of a controlled pneumatic actuator 16 that acts on the tool to functionally engage or not the tool 13 with the driving shaft 12. Let's note that, in a simplified alternative embodiment not shown, a single articulation, like that referred to as 17, may allow obtaining the three above-mentioned disengagement, working and rest positions.

Figure 3:
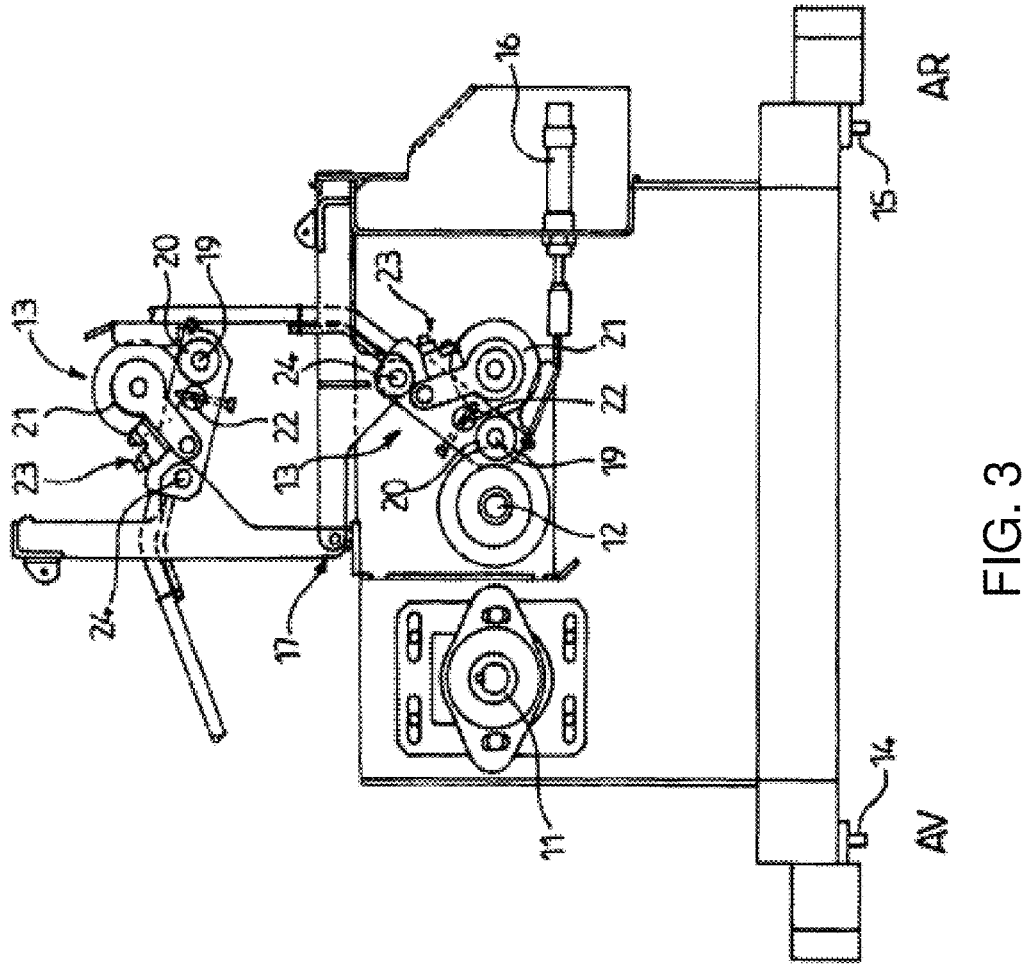
FIG. 3 shows a side view of the bitumen emulsion and fibre spreading system at the level of a module with the tool in a working position and in a disengagement position.

An element of the rubber wheel type allows the functional engagement of the tool with the driving shaft 12 by friction. More precisely and as better seen in FIG. 3, each of the tools of the modules has a first axis 19 on which is located the part coming into engagement by friction with the driving shaft 12 to transmit the rotation torque/motion to a chopping roller. On this first axis 19 is mounted a chopping roller 20 with interchangeable blades. A rubber wheel (or of other material) is mounted integral with the driving shaft 12 and that is through this wheel that the chopping roller can be engaged. The tool further comprises, on a second axis, a pressing roller 21 mounted free in rotation, which allows maintaining the continuous fibre in contact with the chopping roller for the chopping thereof. The pression of the pressing roller is ensured by an adjustable spring system 23 for wear compensation and pressure adjustment. A holding roller 22, also mounted free in rotation on a third axis, allows the continuous fibre to be held on the pressing roller 21 upstream from the chopping roller 20 while preventing the disengagement of the continuous fibre towards the rear when the tool is at rest.

The position of the holding roller 22 is adjustable and it is spring-loaded for wear compensation. These elements, axes and rollers are mounted on an articulated support, in 24, which allows, according to its position, the tool to be placed in the working position or the rest position. This support is itself mounted articulated in 17 with respect to the module frame in order to allow the full swivelling of the tool out of the module in a disengagement position of the tool for cleaning, maintenance or part replacement operations.

Journals, typically ball or roll bearings, are implemented at certain of the separations between modules and at the two ends of the bitumen emulsion and fibre spreading system 3 to hold the driving shaft within the system 3. The driving shaft 12 may be continuous or not (for example, segmented, in particular into two parts meshing/engaging with each other) across the bitumen emulsion and fibre spreading system 3.

It is understood that the machine may be modified according to the needs without that way departing from the scope defined by the claims. The bitumen emulsion and fibre spreading system can also be installed on a trailer coupled to a vehicle, the whole forming the spreading machine for traffic pavement renovation for implementing the method of the invention.

In the case where the machine would be provided to spread two types of bitumen emulsion, including a "clean" one, the machine may include two spreading lines, each with a pump and regulation means as well as two tanks, or with a tank split into two independent parts.

One of the two tanks or a part of the single tank may contain a soft bitumen emulsion, that is to say an emulsion that is not a "clean"/"trackless" emulsion, the second tank or the other part of the single tank containing the "clean"/ "trackless" emulsion. The use of two types of bitumen emulsion allows adapting the residual bitumen emulsion to the use: bonding to pavement and non-bonding to the tyres, and this also allows adjusting the dosing thereof.

The invention thus allows improving the bonding of the asphalt coat to the "membrane" formed by the sandwich tack coat-fibre-surface coat, by suppressing the application of protection gravels, thanks to the use of an emulsion for a so-called "clean" ("trackless") tack coat. The targeted residual bitumen dosages are approximately between 0.4 $kg/m^2$ and 0.6 $kg/m^2$ (0.09 Gal./SY and 0.14 Gal./SY) with a fibre dosage of about 100 $gr/m^2$ (3.0 oz/SY). It is hence possible to use less bitumen than with the known solutions, while having better results in terms of bonding, resistance to rising cracks, thanks in particular to the absence of the gravel coat of the known solutions. Moreover, the bonding performances obtained by the invention are also improved with respect to a "clean" tack coat alone, with a binder dosage equivalent to that of the "membrane" of the invention, the fibres thus intervening in the bonding performance, which was not expected.

The invention claimed is:

1. A method for renovating a vehicle traffic pavement, the method comprising the following steps:

a first step of spreading in order to obtain a lower bituminous tack coat; then a second step of spreading fibers in order to obtain an intermediate coat of fibers; then a third step of spreading in order to obtain an upper bituminous surface coat, the first step of spreading, the second step of spreading, and the third step of spreading being executed during a single passage of a spreading machine on the vehicle traffic pavement to renovate, the fibers being sprayed on the lower bituminous tack coat, the sprayed fibers having a maximum length of 12 cm (4.7 inches);

a subsequent step in which the surface coat is covered with a bituminous asphalt, wherein the surface coat is a coat of trackless bitumen emulsion or the surface coat includes an anhydrous bituminous binder, wherein the trackless bitumen emulsion includes hard bitumen, the trackless bitumen emulsion providing a residual binder once a breaking of the emulsion is obtained, the residual binder of the trackless bitumen emulsion having the following properties:

a penetration grade lower than 40 dmm (0.157 inches), and a Ball-Ring temperature higher than 50° C. (122° F.), wherein the trackless bitumen emulsion includes from 30% to 70% of bitumen, from 30% to 70% of water, from 0.1% to 10% of at least one surfactant and at least one additive, the percentage being in weight, wherein the anhydrous bituminous binder comprises oils able to evaporate, and the anhydrous bituminous binder has the following properties after evaporation of the oils: a penetration grade lower than 40 dmm (0.157 inches), and a Ball-Ring temperature higher than 50° C. (122° F.).

2. The method according to claim 1, wherein the residual binder of the trackless bitumen emulsion has the following properties: a penetration grade lower than 20 dmm (0.78 inches).

3. The method according to claim 2, wherein the trackless bitumen emulsion includes from 30% to 70% of bitumen, from 30% to 70% of water, from 0.1% to 3% of at least one surfactant, at least one stabilizer, and at least one polymer additive, the percentage being in weight.

4. The method according to claim 2, wherein the lower bituminous tack coat includes one of the trackless bitumen emulsion and the anhydrous bituminous binder.

5. The method according to claim 3, wherein the lower bituminous tack coat includes one of the trackless bitumen emulsion and the anhydrous bituminous binder.

6. The method according to claim 1, wherein the trackless bitumen emulsion includes from 30% to 70% of bitumen, from 30% to 70% of water, from 0.1% to 3% of at least one surfactant, at least one stabilizer, and at least one polymer additive, the percentage being in weight.

7. The method according to claim 6, wherein the lower bituminous tack coat includes one of the trackless bitumen emulsion and the anhydrous bituminous binder.

8. The method according to claim 1, wherein the at least one additive is selected from stabilizers, anti-freezing agents, thickening agents, polymer additives, pH-modifying agents, and adhesivity dopes, wherein the polymer additives are selected from natural latex, styrene-butadiene-styrene (SBS), styrene-butadiene-rubber (SBR), ethylene-vinyl acetate (EVA), wherein the adhesivity dopes are selected from alkyl-polyamines, alkyl amido-polyamines, and alkyl imidazo-polyamines, and wherein the pH-modifying agent is hydrochloric acid.

9. The method according to claim 1, wherein the lower bituminous tack coat includes one of the trackless bitumen emulsion and the anhydrous bituminous binder.

10. The method according to claim 9, wherein the trackless bitumen emulsion has the following properties:

---

Saybolt-Furol Viscosity @ 25° C., secs: 20-150, sieve non-passing fraction, % Max.: 0.3, demulsibility, % Min.: 40, and storage stability, % Max: 1.

---

11. The method according to claim 1, wherein the fibers are selected from glass fibers, synthetic fibers, and organic fibers.

12. The method according to claim 1, wherein the residual binder of trackless bitumen emulsion has the following properties:

residue by distillation at 177° C. (350° F.) [oil distillate, % max]: 3, and solubility %, Min.: 97.

13. The method according to claim 1, wherein the lower bituminous tack coat is applied at a dosage of 1.125 kg/m²+/−0.675 kg/m² (0.25 Gal./SY+/−0.15 Gal./SY) and the surface coat is applied at a dosage of 1.125 kg/m²+/−0.675 kg/m² (0.25 Gal./SY+/−0.15 Gal./SY), and wherein the fibers are glass fibers and the glass fiber coat is applied at a dosage of 75 gr/m²+/−45 gr/m² (2.2 oz./SY+/−1.3 oz./SY).

14. The method according to claim 1, wherein, before the first step of spreading, the surface of the vehicle traffic pavement to renovate is milled or planed in order to detach surface materials from the pavement, and the detached materials are removed from the vehicle traffic pavement to renovate.

15. The method according to claim 14, wherein a resulting milled or planed vehicle traffic pavement includes parallel grooves, the parallel grooves being elongated along a vehicle traffic pavement length direction, and wherein the bitumen emulsion and the fibers are spread in a sufficient quantity to obtain a uniform surface.

16. The method according to claim 1, wherein the anhydrous bituminous binder is hot spread.

17. The method according to claim 1, wherein the at least one additive comprises at least one stabilizer.

18. A spreading machine for simultaneously spreading fibers and bitumen emulsion for a vehicle traffic pavement renovation method, the machine comprising:

a reserve of fibers;

a bitumen emulsion tank containing a trackless bitumen emulsion; and a bitumen emulsion and fiber spreading system including a first bitumen emulsion spreading boom, a fiber spraying device, and a second bitumen emulsion spreading boom, the first and second bitumen emulsion spreading booms including nozzles, the first bitumen emulsion spreading boom, the fiber spraying device, and the second bitumen emulsion spreading boom being disposed to spread successively and superimposed, during travel in a single passage of the spreading machine on the vehicle traffic pavement to renovate, a lower bituminous tack coat comprising bitumen emulsion sprayed by the first bitumen emulsion spreading boom, then an intermediate coat of fibers comprising fibers sprayed by the fiber spraying device, said sprayed fibers having a maximum length of 12 cm (4.7 inches), then an upper bituminous surface coat comprising bitumen emulsion sprayed by the second bitumen emulsion spreading boom, to bind the sprayed fibers between two coats of trackless bitumen emulsion, the trackless bitumen emulsion containing hard bitumen, the trackless bitumen emulsion providing a residual binder once a breaking of the emulsion is obtained, the residual binder of the trackless bitumen emulsion having the following properties: a penetration grade lower than 40 dmm (0.157 inches) and a Ball-Ring temperature higher than 50° C. (122° F.), and the trackless bitumen emulsion includes from 30% to 70% of bitumen, from 30% to 70% of water, from 0.1% to 10% of at least one surfactant and at least one additive, the percentage being in weight.

19. The machine according to claim 18, wherein the fibers are glass fibers, the fibers are in the form of continuous fibers in the reserve of fibers, and the fiber spraying device includes a set of modules, each of the modules including two nozzles and a tool for pulling the continuous fibers, chopping the continuous fibers, and spraying the chopped fibers towards the pavement.

20. Machine according to claim 18, wherein the at least one additive comprises at least one stabilizer.

\* \* \* \* \*